Nov. 10, 1959 D. A. PERINO 2,912,336
MEAT MERCHANDISING PACKAGE
Filed May 31, 1956

INVENTOR.
D. A. Perino
BY
Lieber & Lieber
ATTORNEYS.

2,912,336

MEAT MERCHANDISING PACKAGE

Dominic A. Perino, Milwaukee, Wis., assignor to Milprint, Inc., Milwaukee, Wis., a corporation of Delaware Application May 31, 1956, Serial No. 588,278

1 Claim. (Cl. 99—174)

The present invention relates generally to improvements in the art of packaging commodities, and relates more particularly to the provision of an improved heat transmitting commodity container especially adapted for packaging foods to be heated before serving.

A primary object of the invention is to provide an improved heat transmitting commodity container which is extremely simple and economical in construction and which is moreover highly efficient in actual use.

Many types of containers have heretofore been proposed for protectively packaging commodities for merchandising purposes. Among these different types of prior commodity containers are some which are intended primarily for confining food products adapted to be heated before serving, the containers being formed of materials which are capable of withstanding relatively high temperatures to thereby permit heating of the packaged commodity prior to removal from the container and without need for using cooking utensils. The commodity merchandising containers thus provided and intended for use in protectively packaging foods to be heated in the package before serving have been of both the rigid or semi-rigid and the flexible type, and some of these containers have enjoyed a certain degree of success in the packaging field. However, the heat conductivity of these prior containers and wrappers has generally been relatively poor and the use thereof for their intended purpose has accordingly been necessarily limited to foods which merely require warming. Furthermore, considerable care is required in the methods of heating these prior packages and in the regulation of the heat to which they are subjected, and it has also been found that there is frequently an unequal distribution of heat within the container or wrapper with the result that some portions of the commodity are less palatable than others.

It is therefore a more specific object of this invention to provide an improved merchandising container for commodities to be heated therein which obviates all of the objections and disadvantages heretofore attendant commodity containers intended for similar purposes.

Another specific object of the present invention is to provide an improved commodity container which is especially adapted for packaging food for merchandising purposes and which is moreover adapted for use in the preparation of the packaged commodity by application of heat.

Another specific object of my invention is to provide an improved commodity container which may be subjected to heat of varying degrees so as to cook the commodity confined therein without removing the same from the container and which is moreover adapted to withstand extremely high temperatures and to conduct heat uniformly to the enwrapped product with utmost efficiency.

Still another specific object of my present invention is to provide an improved and novel food package which is adapted to be placed directly into an electric toaster or the like for cooking the packaged commodity prior to serving the same.

An additional specific object of the present invention is to provide an improved commodity container comprising a body formed of heat conducting material such as metal foil adapted to be sealed to confine a commodity therein, the exterior of the body being treated to render the same absorbent to heat and relatively non-reflective and the interior surface thereof being reflective for radiating heat uniformly throughout the enclosure.

These and other specific objects and advantages of the invention will become apparent from the following detailed description.

A clear conception of the present improvement and of the mode of utilizing commodity containers embodying the invention may be had by referring to the drawing accompanying and forming a part of this specification, wherein like reference characters designate the same or similar parts in the various views.

Figure 1:
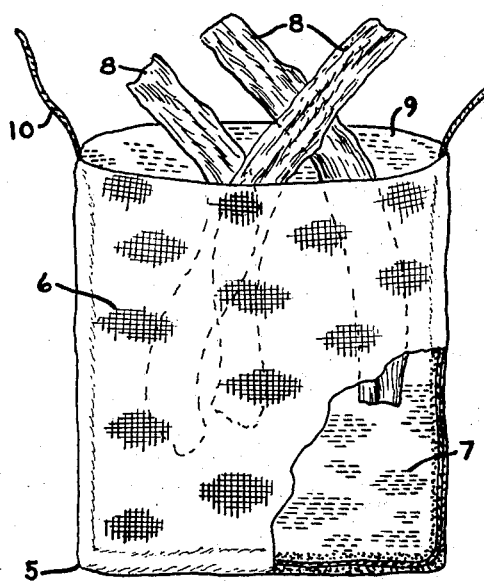
Fig. 1 is a perspective view of a typical flexible bag-like container embodying the invention and showing several slices of bacon being placed therein prior to final sealing thereof, a portion of the container wall being broken away to reveal the interior.

While the invention has been particularly shown and described herein as being especially advantageously applicable to the packaging of certain commodities such as bacon and to the preparation thereof by heating in an ordinary electric toaster, and while the commodity package has been shown as being of bag-like formation and formed of metal foil having a black heat absorbing outer coating, it is not desired or intended to thereby unnecessarily restrict or limit the invention by reason of such specific embodiment, since the improvements may obviously be advantageously utilized in the packaging and preparation of other commodities housed within other sutiable heat conductive packaging materials and adapted to be heated prior to consumption or use. It is also contemplated that certain specific descriptive terms used herein shall be given the broadest possible interpretation consistent with the disclosure, and that the term "heat conductive" and "relatively high temperatures" shall be interpreted as being comparative terms relative to the properties of other packaging materials such as paper and packaging films which have poor heat conductivity and cannot withstand high degrees of heat.

Referring to the drawings, the improved bag-like commodity receptacle shown therein as embodying the present invention comprises, in general, a body 5 formed of heat conductive sheet material such as metal foil capable of withstanding relatively high temperatures and having the additional property of being heat conductive, the sheet material being folded to pouch-like or bag-like formation and being sealed at the marginal edges in a suitable manner to provide the receptacle, the exterior surface of the sheet forming the receptacle being covered in a suitable manner as by printing with a heat absorbent coating 6 which is shown as being a black surfacing, and the interior surface 7 of the sheet forming the receptacle 5 being preferably, but not necessarily, uncoated and heat reflective as indicated by the sectioning for silver in the drawing.

The receptacle 5 may furthermore be provided as desired with identifying indicia as is customary with commodity merchandising packages, and the commodity to be merchandised may be inserted within the container as shown in Fig. 1 in a customary manner, the commodity in the instant case being shown as a batch of bacon slices 8. After the commodity 8 has been inserted within the container 5 the mouth portion 9 of the container may be closed and sealed in a customary manner to thereby provide a protective commodity package, and for purposes of facilitating opening of the package and removal of the commodity 8, tear string 10 may be provided as shown, the tear string 10 being conveniently disposed within the seam portions along opposite sides of the container and being formed of a heat resistant material such as Fiberglas so as not to disintegrate when subjected to heat.

Figure 2:
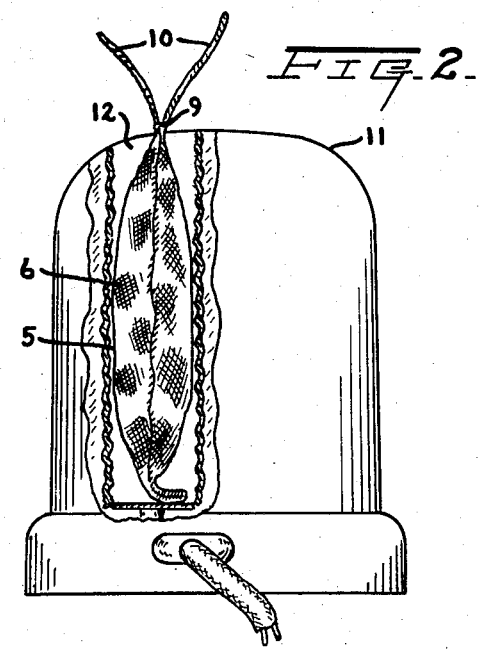
Fig. 2 is an end view of the sealed commodity package disposed within one of the heating compartments of a typical electric toaster, a portion of the toaster being broken away to reveal the package being heated.
Figure 3:
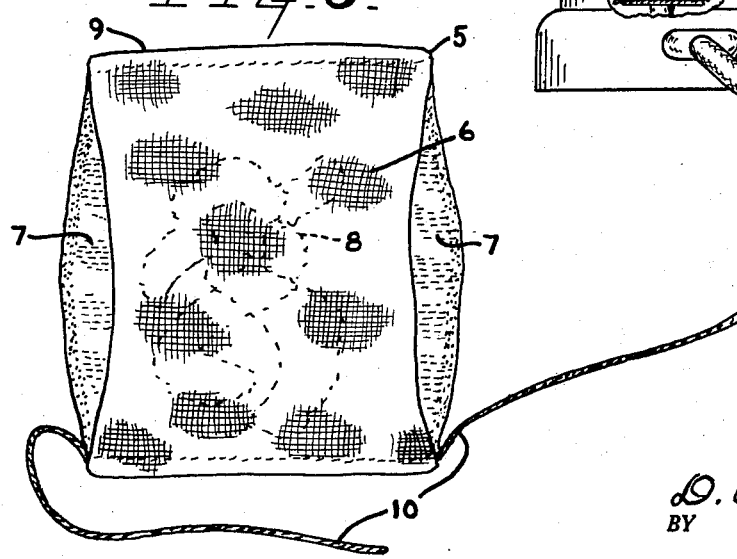
Fig. 3 is a perspective view of the heated package being torn open for access to the cooked commodity.

In use the improved commodity package may be used by the merchant for displaying and merchandising the product and when the ultimate consumer is desirous of consuming the product 8, it is only necessary to insert the assembled package within one of the compartments 12 of an ordinary electric toaster 11 as shown in Fig. 2 to thereby heat the same. In inserting the package within the toaster, it is preferable to do so by the means of the tear string 10 in such a manner that the ends of the string 10 will extend upwardly outside of the heating compartment 12 to thereby provide convenient means for removal of the container 5 after the heating process. Since the walls of the container 5 become extremely hot during the heating of the package even at the temperatures to which the same is subjected, the consumer should take care in removing the package by means of the string 10 which may then be pulled in opposite directions in an obvious manner to tear the opposite edges of the container open and thereby provide access to the cooked commodity 8. By coating the outer surface of the container 5 with a heat absorbent coating 6, it has been discovered that the package need only be subjected to relatively low temperatures in order to fully cook the packaged commodity since the receptacle or body 5 most efficiently absorbs the heat with maximum effectiveness, and in a matter of seconds, it has been found that bacon can be heated sufficiently to render the same well cooked and extremely palatable. To accomplish the desired purpose, it is necessary that the container 5 be formed of a material which possesses a relatively high degree of heat conductivity, and it is also necessary to provide the body 5 with an exterior surfacing or treatment to render the same heat absorbent, and the heat thus absorbed is transmitted uniformly over the inner surface of the body 5 to the commodity to uniformly treat the same without burning or scorching in certain localities while rendering other areas of the commodity relatively uncooked as when the commodity is subjected to a direct heating action. It has also been found that a heat reflective inner surface 7 aids in heating the enclosed commodity 8 by radiation of heat transmitted uniformly throughout the entire area of the body 5, and it is, therefore, also advantageous to leave the surface 7 heat reflective.

From the foregoing detailed description it is believed apparent that the present invention contemplates the provision of an improved commodity merchandising container and final commodity package which is novel in construction and which enables food or other commodities to be heated directly within the container prior to consumption. By virtue of the improved package diverse foods such as bacon, slices of meat, vegetables and the like may be rendered palatable by a cooking process without need for using cooking utensils and in a most convenient manner without need for special cooking equipment other than an ordinary electric toaster or the like. The improved containers make possible the merchandising of commodities in a protective commodity container which is attractive in appearance and which may moreover serve the purpose of facilitating heating or cooking. While the receptacle illustrated in the drawing is of bag-like formation formed of flexible sheet stock such as metal foil, the invention may obviously be utilized to advantage in the formation of more or less rigid or semi-rigid containers intended for like purposes, and while a tear string has been shown for facilitating opening of the bag after heating, other opening means may be used with equal success. In this respect, it is noted that the opening means shown herein serve the two-fold purpose of facilitating opening of the package and convenient handling means for inserting and removing the package into and out of the heating compartment of a toaster. The novel container may also be formed with the aid of bag-making equipment, and the exterior heat absorbent coating may be applied as hereinabove indicated by means of printing or the like with a dark surface being utilized on the exterior for the absorption of heat which is then conducted through the body of the sheet material for even distribution throughout the interior of the package.

It should be understood that it is not desired or intended to limit this invention to the exact details of construction or to the precise mode of use herein shown and described, since various modifications within the scope of the appended claim may occur to persons skilled in the art to which this invention pertains.

I claim:

A commodity merchandising package of a sliced meat product adapted to be prepared by heating the same prior to serving, said package comprising, a closed and sealed pouch formed of heat-conductive pliable metal foil having a normally bright heat-reflective surface and capable of withstanding relatively high temperatures, said pouch being formed to position said bright heat-reflective surface within the interior thereof, and a sliced meat product adapted to be heated before serving loosely confined within said sealed pouch, said pouch having the entire exterior surface only thereof printed with a dark heat-absorbent coating and having its entire inner surface devoid of coating to thereby fully retain its heat reflective character and insure even distribution of heat throughout the package and about the meat slices.

References Cited in the file of this patent

UNITED STATES PATENTS

| | | |
|---|---|---|
| 2,511,404 | Glenkey | June 13, 1950 |
| 2,674,536 | Fisher | Apr. 6, 1954 |
| 2,684,177 | Kennedy | July 20, 1954 |
| 2,759,830 | Touceda | Aug. 21, 1956 |
| 2,807,550 | Zarotschenzeff | Sept. 24, 1957 |

FOREIGN PATENTS

| | | |
|---|---|---|
| 217,616 | Great Britain | June 26, 1924 |
| 436,229 | Great Britain | Oct. 7, 1935 |
| 372,731 | Germany | Feb. 8, 1921 |

OTHER REFERENCES

"Comparison of Foil Packages," reprinted from: Modern Packaging, April 1955, page 220.